United States Patent [19]

Cuthbert et al.

[11] 3,879,131

[45] Apr. 22, 1975

[54] PHOTOMASK INSPECTION BY REAL TIME DIFFRACTION PATTERN ANALYSIS

[75] Inventors: John David Cuthbert, Bethlehem; Delmer Lee Fehrs, Easton; David Farnham Munro, Alburtis, all of Pa.

[73] Assignee: Bell Telephone Laboratories, Incorporated, Murray Hill, N.J.

[22] Filed: Feb. 6, 1974

[21] Appl. No.: 440,151

[52] U.S. Cl. .............. 356/106 R; 250/550; 250/563; 250/572; 356/71; 356/111

[51] Int. Cl. .............. G01n 21/32

[58] Field of Search .......... 356/106 R, 71, 160, 109, 356/111; 250/550, 563, 572

[56] References Cited

UNITED STATES PATENTS

| | | | |
|---|---|---|---|
| 3,630,596 | 12/1971 | Watkins | 356/71 X |
| 3,658,420 | 4/1972 | Axelrod | 356/71 |
| 3,790,280 | 2/1974 | Heinz et al. | 356/71 |

*Primary Examiner*—Ronald L. Wibert
*Assistant Examiner*—Matthew W. Koren
*Attorney, Agent, or Firm*—H. W. Lockhart

[57] ABSTRACT

A focused beam of laser light producing a spot smaller than the minimum size of any valid feature of the photomask pattern is swept in a raster over the pattern being inspected. The light transmitted and diffracted by the locally illuminated pattern is collected and presented as a stationary but time-varying diffraction pattern to a detector array. The electrical output signals from the detectors are processed to distinguish diffraction patterns which are produced by edges of valid features from patterns produced by edges of defects. This photodetector analysis may involve several types of photodetector arrangements and may further involve analog, digital or hybrid computers.

9 Claims, 31 Drawing Figures

PHOTOMASK INSPECTION BY REAL TIME DIFFRACTION PATTERN ANALYSIS

FIELD OF THE INVENTION

This invention relates to techniques for using optical and electronic means for inspecting opaque patterns on light transmissive substrates and more particularly, for inspecting photomasks used in the fabrication of semiconductor devices and integrated circuits.

BACKGROUND OF THE INVENTION

A basic tool in the fabrication of semiconductor devices, and particularly silicon semiconductor integrated circuits, is the photomask. Typically this is an opaque metal pattern formed on a transparent substrate such as glass. Photomask patterns, particularly those used to define integrated circuits, generally are composed of straight edges. Such photomasks may represent areas of the semiconductor to be masked or unmasked for impurity introduction, metal deposition, selective film removal or the like. In order to get a respectable circuit yield, the photomasks must have a very low defect density. Because minute defects can be critical, inspection of the masks poses a difficult problem.

A variety of opto-electronic techniques have been developed for photomask pattern inspection. Some techniques involve the use of holography, or matched filters for comparison. Systems which perform a pattern inspection by sweeping over the pattern in a raster scan have also been devised. In one arrangement the inspection is largely restricted to patterns having orthogonally disposed patterns in which defects are detected by the presence of anomalous pulse widths as the pattern is scanned. Another system makes use of the pattern redundancy inherent in an integrated circuit master or working copy mask in order to perform the inspection. In such a system two scanning spots are used and the information from the two spots is compared in order to find the defects.

Spatial filtering systems make use of the diffraction pattern produced by illuminating the entire pattern of an integrated circuit photomask. In these systems, as broad a beam as possible is used to illuminate a maximum number of identical integrated circuit mask patterns simultaneously. A spatial filter placed in the Fourier plane then blocks the light from valid repeated features while passing the light from isolated defects.

Except for the pulse-width technique all these systems involve comparative techniques, requiring perfect or standard photomasks or filters and further, requiring precise alignment or orientation for the inspection operation. Accordingly, there is a need for an inspection system which is absolute and completely flexible in the sense that it requires no comparison arrangement to determine the presence of defects, yet which overcomes the restrictions and limitations of the pulse-width technique.

Moreover, spatial filtering techniques may be affected by variations in thickness of the photomask substrates. Thus, it is desirable that an optical photomask inspection be independent of reasonable variations in substrate thickness.

SUMMARY OF THE INVENTION

In accordance with this invention, a small region of the pattern under inspection is illuminated using a focused beam of coherent light. In particular, the light spot illuminating this small region is smaller than the minimum feature size of the pattern. The light transmitted and diffracted by the small illuminated region is collected and presented to a photodetector array. When the illuminated region includes an edge or edges, in the case of a corner, a characteristic diffraction pattern is produced. This pattern is presented to an array of photodetectors, the output signals from which are analyzed to distinguish between the presence of a valid edge and an edge of a defect. For the patterns of interest herein, valid edges are substantially straight, whereas the edges of defects almost never are straight.

In practice the light spot is scanned over the photomask pattern under inspection in raster fashion and any resulting diffraction patterns are analyzed continuously. The analysis involves only the most basic of comparisons, that between the diffraction patterns produced by straight edges and those resulting from the irregular boundaries of defects.

Thus the method in accordance with this invention has a great degree of flexibility inasmuch as it does not require a comparison with a perfect pattern as in dual spot scanning systems for example, nor is it necessary that the pattern under inspection be specially aligned with respect to the scanning beam.

It is also a feature of one form of the invention to provide a descanning mirror to render the instantaneous diffraction pattern stationary for presentation and analysis by the photodetector array. Accordingly, the variation in the pattern with time represents the scan of the light spot over the pattern under inspection.

A further feature is the use of photodetector arrays so that analysis of diffraction patterns is accomplished by observing the ratio between amounts of light falling on particular photodetectors. In one mode this may involve comparison of maximum and minimum observed values. Ancillary to this feature are optical arrangements for dividing the light beam constituting the diffraction pattern into separate portions for interception by the photodetector array.

Figure 4A:
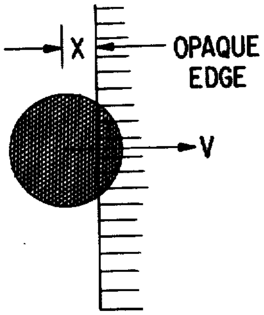
FIGS. 4*a*, 4*a*, *b* and 4*c* are diagrams illustrating different situations of the scanning spot interacting with an edge.
Figure 4A:
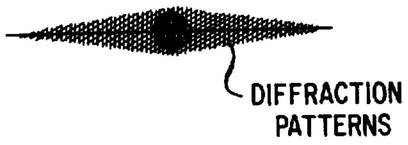
Figure 4B:
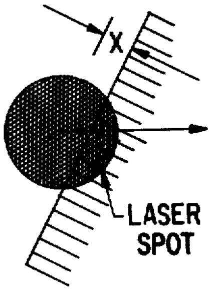
Figure 4B:
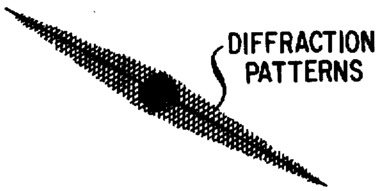
Figure 4B:
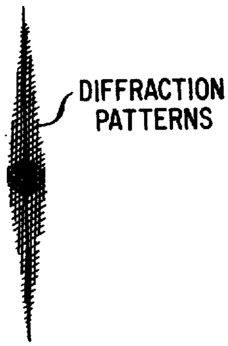
Figure 4C:
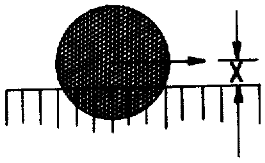
Figure 5A:
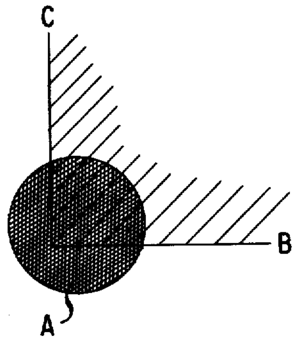
Figure 5A:
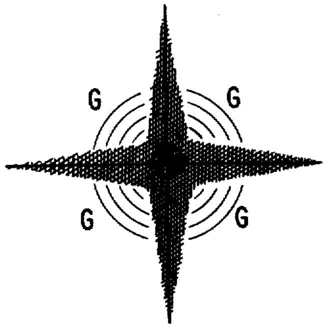
Figure 5B:
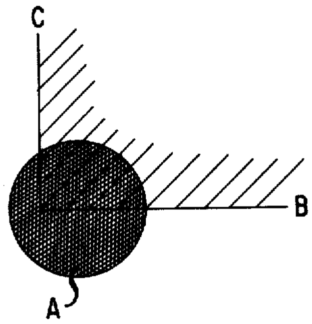
Figure 5B:
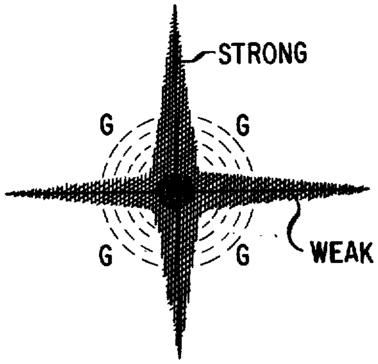
Figure 5B:
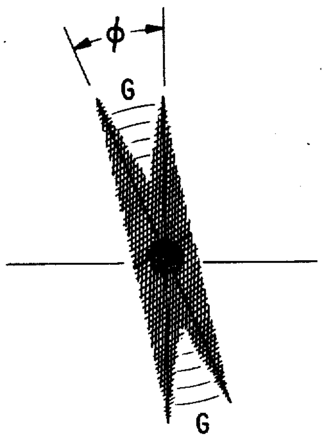
Figure 5C:
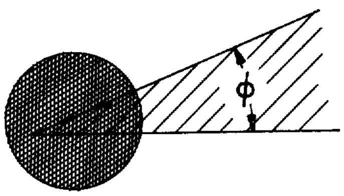
Figure 7:
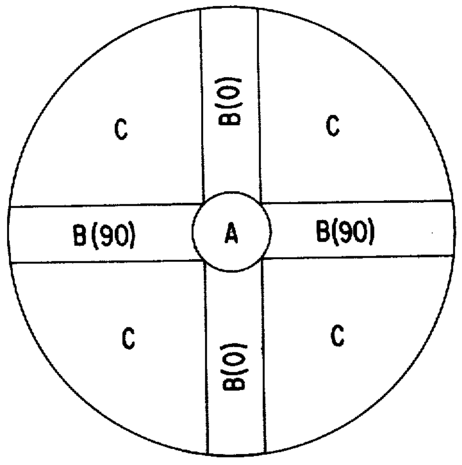
Figure 8:
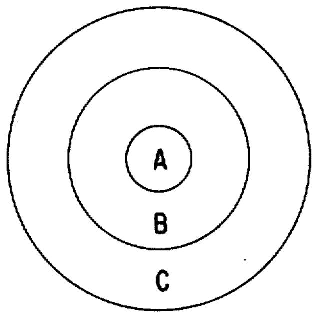
Figure 9:
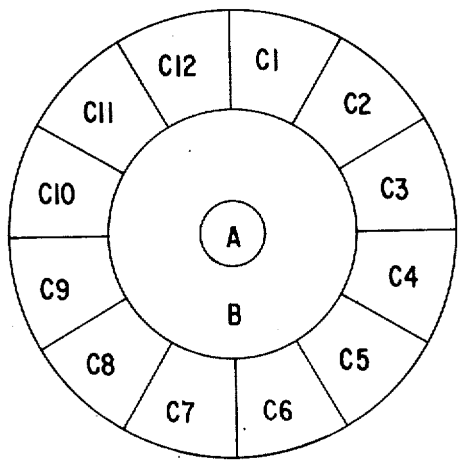

FIGS. $4a_1$, $4b_1$ and $4c_1$ illustrate the corresponding diffraction patterns for the situations of FIGS. 4*a*, 4*b* and 4*c*;

FIGS. 5*a*, 5*b* and 5*c* are similar diagrams to those of FIGS. 4*a*, 4*b* and 4*c* illustrating interaction of the scanning spot with corners;

FIGS. $5a_1$, $5b_1$ and $5c_1$ illustrate corresponding diffraction patterns;

FIGS. 6*a* through 6*f* illustrate forms of defects in photomasks;

FIGS. $6a_1$ through $6f_1$ show the diffraction patterns corresponding to these defects; and FIGS. 7, 8 and 9 are photodetector arrays useful in the practice of this invention.

DETAILED DESCRIPTION

Figure 1:
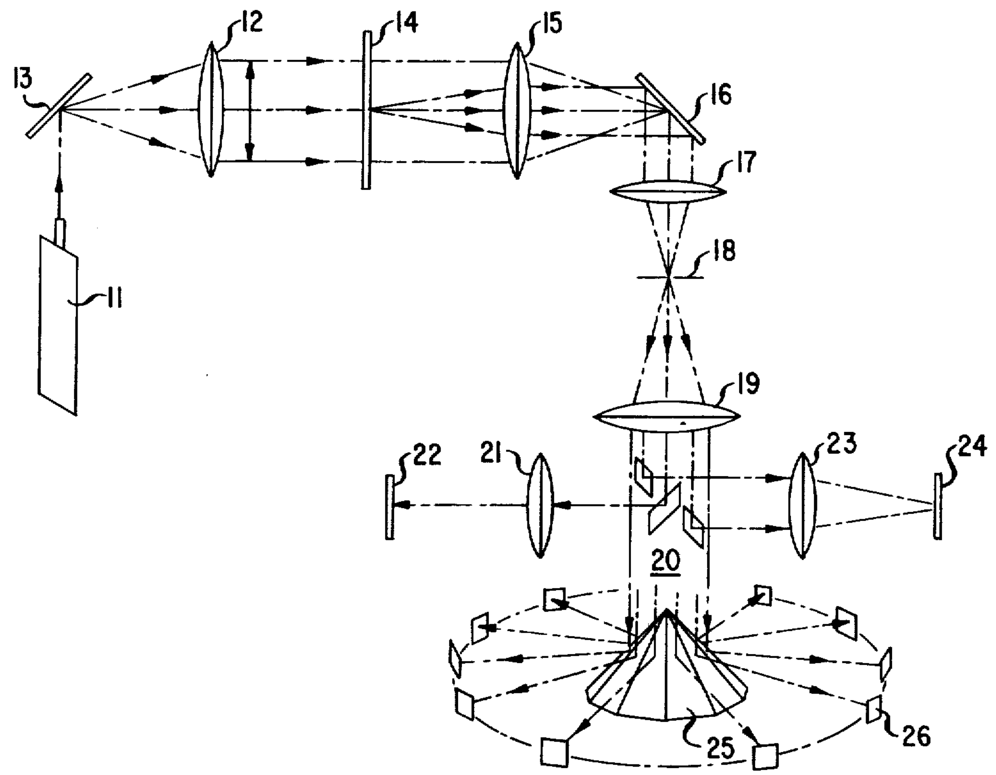
FIG. 1 is a schematic diagram of the optical system of the invention.

One form of optical arrangement for performing photomask inspection in accordance with this invention is shown in FIG. 1. A spot of coherent light generated by a laser 11 and focused by lens 12 is swept in a raster over the photomask 14 by the movement of a scanning mirror 13. The light transmitted by the photomask 14 is collected by the lens 15 and directed to the descanning mirror 16. As is known, the desired beam focusing requires the scanning mirror 13 to be spaced one focal length from lens 12 and the photomask 14 to be one focal length on the other side of the lens 12. The same spacing relationships apply with respect to the lens 15, the photomask 14, and the descanning mirror 16. Further, the scanning and descanning mirrors are driven at precisely the same frequency but with a 180° phase relationship so that the output of the descanning mirror 16 is a beam of light whose direction is stationary, but whose distribution varies with time. Accordingly, the output of the descanning mirror is a motionless diffraction pattern. This pattern contains unwanted, or non-collimated, light as a result of scattering and reflection at the various lens surfaces. This light is removed by focusing the beam and passing it through an aperture 18. The beam then passes through lens 19 which serves to recollimate it and reform the diffraction pattern.

In a preferred embodiment, the recollimated beam from lens 19 is divided into three parts, a core or central portion, an intermediate annular portion, and an outer annular portion. This is done by an array of mirrors depicted schematically in FIG. 1 and, in enlarged form, in FIG. 2.

Figure 2:
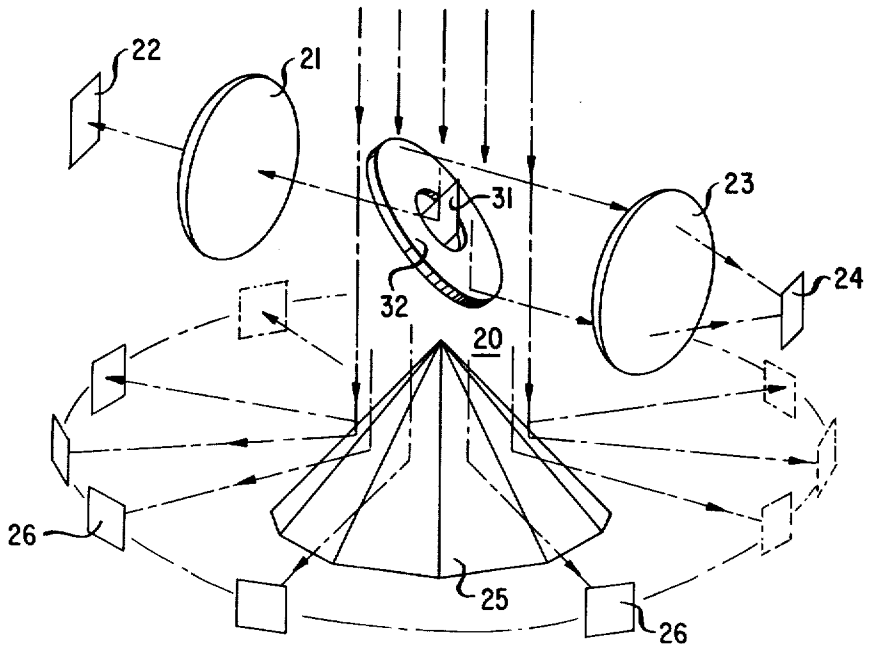
FIG. 2 is a more detailed schematic diagram of a portion of the optical system for dividing and detecting the output beam.

Referring particularly to FIG. 2 the central mirror 31 intercepts the central or d.c. beam and directs it through lens 21 to photodetector 22. Mirror 32 intercepts an inner annulus of the beam and directs the light through focusing lens 23 to photodetector 24. The outer annular portion of the light beam is intercepted by twelve segmental mirrors 25 which reflect it upon the photodetectors 26.

Thus the beam of light is divided into separate portions by optical means with each portion being directed on a photodetector. As is known, the intensity of light falling on a given detector generates an analog current which may be transformed into a voltage and suitably amplified. The output signals from the various photodetectors are applied to analog and digital networks to determine whether or not a diffraction pattern, if present, indicates the presence of a defect.

It will be understood that the particular embodiment described above, in which optical means divide the beam, provides certain advantages such as the use of individual small photodetectors which generally have a faster response than that of larger area photodetectors. The invention, however, is not dependent upon the particular optical arrangement described above. Alternatively the descanning mirror 16 could be replaced by an extensive photodetector array upon which the focused beam would impinge directly. In such an arrangement the photodetector array must be located at a distance from the lens 15 equal to its focal length and it is important that the maximum angle to which the beam is deflected be small. In such an arrangement the photodetector array may comprise a substantially planar array of photodetectors for accomplishing a similar function to that achieved by the photodetectors 22, 24 and 26 of FIG. 2. The functional equivalent of the planar array might be as shown in FIG. 9. It will be understood that the term photodetector array encompasses both the planar dispositions as well as more dispersed dispositions of photodetectors as shown, for example, in the embodiment of FIG. 1.

Likewise, an array of photodetectors could be placed just beyond the collimating lens 19. Each of the foregoing arrangements may be adopted depending on the degree of complexity and speed of response desired. The invention herein will be described more particularly in terms of the preferred embodiment illustrated in FIGS. 1 and 2 in which a plurality of individual detectors are disposed to receive portions of the divided and separated light beam.

In the operation of an inspection system in accordance with this invention, the light from scanning lens 12 impinging upon the photomask 14 may do one of three things. It may pass straight through a clear area; be completely blocked by an opaque region, or, be partially blocked and also diffracted by an edge or corner. It is important to this invention that the focused light spot have a diameter smaller than the minimum feature size of the pattern under inspection. It will be understood that feature size refers, for example, to the width of a clear or opaque strip on the photomask. In the case of a Gaussian beam as from a laser operating in the $TE_{000}$mode, the diameter of interest is the distance be tween the $1/e^2$ intensity points. The significance of this relationship of spot size to feature size is to insure that the light spot illuminates only one valid edge or corner of the pattern at a time. As used herein, reference to an edge of the pattern will be understood to include a corner.

Whenever the output of the descanning mirror 16 includes a diffraction pattern, it is processed by the other portions of the optical apparatus depicted in FIGS. 1 and 2 and additional electronics apparatus, as will be explained more fully hereinafter. Defects are distinguished from valid edges in accordance with this invention by virtue of the fact that diffraction patterns associated with valid edges satisfy certain conditions which are not satisfied by those associated with defects.

Figure 3A:
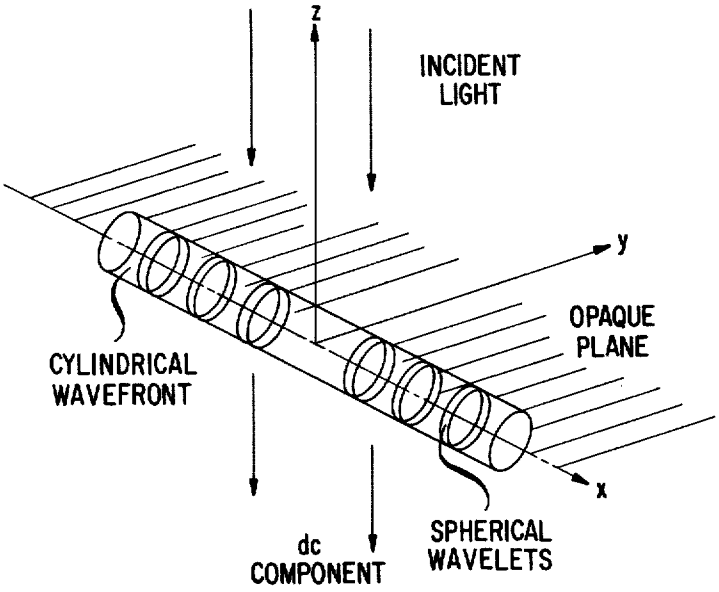
FIG. 3*a* is a schematic diagram illustrating the boundary diffraction wave.
Figure 3B:
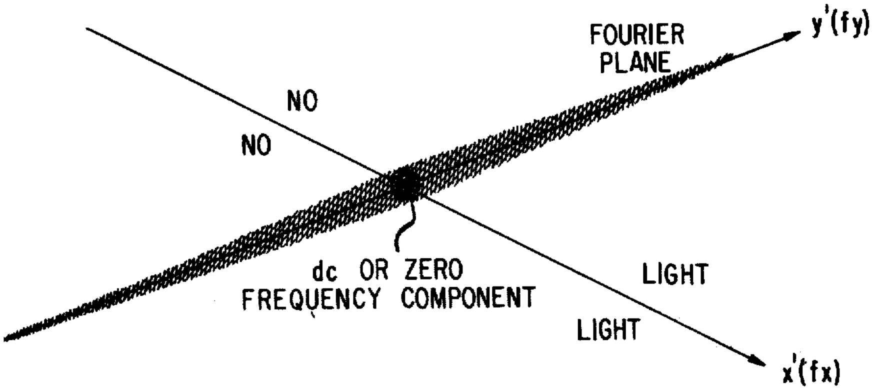
FIG. 3*b* is a schematic view of the diffraction pattern produced by the configuration of FIG. 3*a*.

The existence of these conditions may be better understood from an explanation based upon the boundary diffraction wave theory. According to this theory, the diffraction field associated with an aperture is the sum of two components. The first is a geometrical component and consists of the light distribution estimated on the basis of geometrical optics. In the Fourier plane, this component causes the intense central spot in the diffraction pattern. It is often referred to as the d.c. or zero frequency component of the optical spectrum The second component of the diffraction field is the boundary diffraction wave which emanates from the physical edge region of the aperture. Each small segment of the edge can be thought of as the origin of a Huggens' wavelet whose intensity is proportional to the incident light intensity as well as to other parameters such as edge roughness and gradient of opacity. For a finite length of edge, the wavelets interfere constructively and destructively to produce the macroscopic boundary diffraction wave front. This is illustrated schematically in FIG. 3*a* for the half plane $z = 0$, $y > 0$ which is uniformly illuminated by light parallel to the $z$-axis. The Huygens' wavelets combine to produce a cylindrical wave coaxial with the $x$-axis. After Fourier transformation by a suitable optical system this boundary diffraction wave results in the diffraction pattern shown schematically in FIG. 3*b*. A more extensive explanation of the boundary diffraction wave theory is set forth in *Principles of Optics* by Max Born and Emil Wolf, particularly pages 449 to 453.

As previously stated, the light spot interacts with only one edge of a pattern feature at a time, so that the form of the interaction is dependent only on the perpendicular distance from the spot to the edge. Several different situations illustrate this point for the scanned spot shown in FIGS. 4*a*, 4*b* and 4*c*. In these figures the distance of approach $x$ is identical in each case, so that the distributions of diffracted light in the Fourier plane, shown in FIGS. $4a_1$, $4b_1$ and $4c_1$, are also identical except for a rotational factor. However, the dependence of $x$ on time as the spot scans towards the edge is greatly different for the three cases. In FIG. 4*a*, $x(t)$ varies very rapidly, while in FIG. 4*c*, $x(t)$ is independent of time. In consequence the particular diffraction pattern amplitude depicted in FIG. $4a_1$ exists for a much shorter time compared to that in FIG. $4c_1$.

The boundary diffraction wave theory can be used to predict the distribution of light in the Fourier plane and its dependence on $x$. As noted earlier, the strength of the boundary diffraction wave emerging from a point on a straight edge is proportional to the amplitude of the incident wave at the point. The distribution of light in that component of the diffraction field which is associated with the boundary diffraction wave will always be the same except for a scaling function dependent on the ratio of the distance of approach $x$ to the spot diameter $\sigma$.

The interaction of a light spot with a 90° corner is shown in FIGS. 5*a* and 5*b*. To a good first approximation the spot interacts with the two straight edges comprising the corner as if they were infinitely long so that the resulting diffraction patterns are shown in FIGS. $5a_1$ and $5b_1$. In FIG. $5b_1$, the diffraction pattern component associated with the edge AB is stronger than that from AC both because a longer segment of edge is exposed to the beam and because the light intensity is more intense near the center of the Gaussian spot.

A second order correction to the above description of diffraction at a sharp corner will now be considered. According to the principle of superposition, the cylindrical waves emerging from the two edges forming the corner each propagate independently. However, in the plane of observation (the Fourier plane in this case) they interfere, thereby causing the observed light distribution to be different from what it would otherwise be. For a 90° corner, the cylindrical waves are propagating at right angles to each other so that at any point in the Fourier plane, except near the origin, the phase difference between the waves varies very rapidly with position. Hence, no additional wavefront of significant amplitude can form. Very close to the origin, the phase difference varies more slowly with position (i.e., the cylindrical surfaces overlap more extensively) and a significant light amplitude results. For a more oblique corner, such as that shown in FIG. 5*c*, the surfaces of the emerging cylindrical wavefronts overlap considerably more than for a 90° corner. This causes somewhat more light to enter the areas denoted as G in FIGS. $5a_1$, $5b_1$ and $5c_1$, which, in the first approximation, are entirely dark.

An additional reason that the areas labeled G in FIGS. $5a_1$, $5b_1$ and $5c_1$, receive light is the finite radius of curvature associated with real corners. For the case of a very sharp corner, the boundary diffraction wave emerging from the tip is essentially spherical, but of minute amplitude, because the associated perimeter is very small. Hence, the regions G receive essentially zero light on this account. On the other hand, for a rounded corner, the boundary diffraction wave has a more prominent lobe in the forward direction and because of its larger perimeter, now has larger amplitude. Hence, spatial frequencies near the origin (i.e., regions G in FIGS. $5a_1$, $5b_1$ and $5c_1$) can receive light, with the amount depending upon the radius of curvature of the corner.

Figure 6A:
Figure 6A:
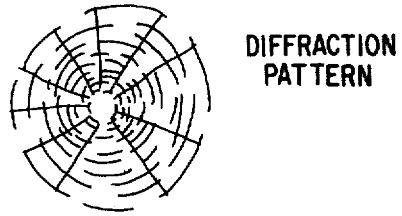

Turning to the characteristic diffraction patterns associated with typical defect shapes, FIG. 6*a* shows a nominally round, opaque defect being illuminated by the light spot. If the spot has a uniform intensity profile, then the diffracted light is similar to that of an Airy disc and, as indicated in FIG. $6a_1$, the light is diffracted strongly into high spatial frequencies. When the diameter of the defect is large, as in FIG. 6*b*, the relative amplitude of the light scattered into high spatial frequencies diminishes, as indicated in FIG. $6b_1$.

Figure 6B:
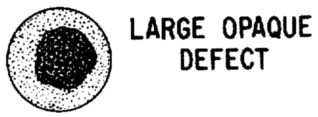
Figure 6B:
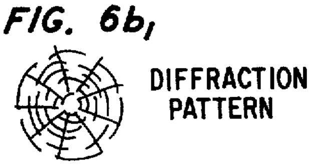
Figure 6C:
Figure 6C:
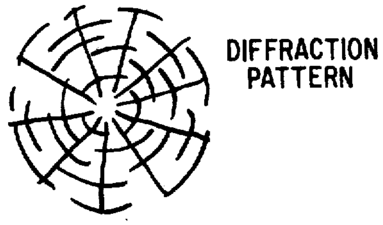

Defects rarely have the rounded shapes shown in FIGS. 6*a* and 6*b*. More typical defect shapes are shown in FIGS. 6*c* through 6*f*, along with their diffraction patterns, FIGS. $6c_1$ through $6f_1$. Usually defects have edges which are very ragged compared to the edges of valid features. When the scale of this raggedness is more than several wavelengths in depth, light is strongly scattered into high spatial frequencies. For the case of a small, approximately round, ragged defect, as in FIG. 6*c*, the distribution of light will still roughly follow the Airy function but will be considerably stronger in amplitude than for a corresponding smooth pinhole.

Figure 6D:
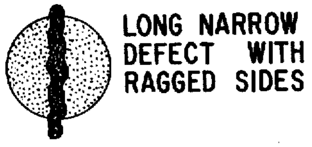
Figure 6D:
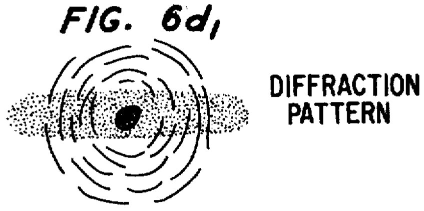
Figure 6E:
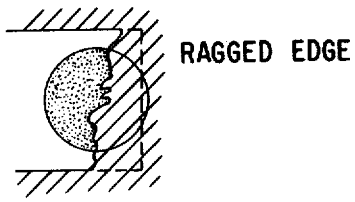
Figure 6E:
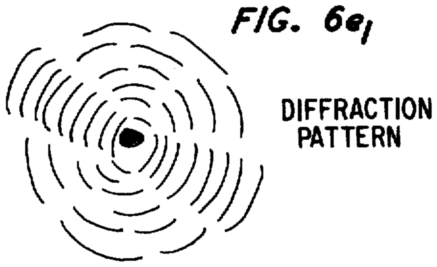
Figure 6F:
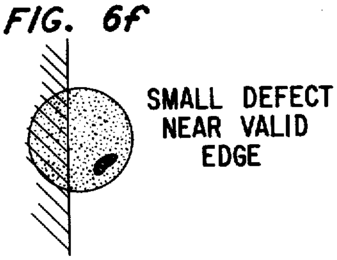
Figure 6F:
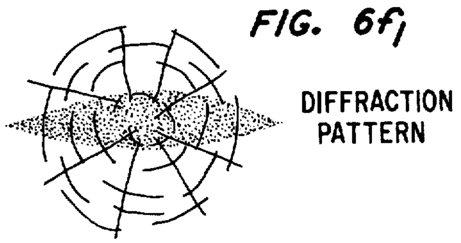

The scattering into high spatial frequencies from a defect such as that shown in FIG. 6*d* is strong both because of the presence of two approximately parallel edges within the spot diameter and because of the roughness of the edges. In FIG. 6*e*, where part of a feature is missing, the net amount of scattering into high spatial frequencies is not as high as in FIG. 6*d*, but because of its roughness still exceeds the amount for a valid straight edge. FIG. 6*f* illustrates an occasionally troublesome situation where a small defect falls close to a valid edge. In addition to the superimposed diffraction patterns associated with the valid edge and defect, there is extra diffracted light caused by the proximity effect. This arises because of the narrow slit formed between the defect and valid edge.

Techniques for distinguishing defects from valid features on the basis of the diffraction pattern differences described hereinbefore use photodetector arrays exemplified by those shown in FIGS. 7, 8 and 9.

In the array of FIG. 7, detector area C is sensitive to light falling anywhere within its boundaries, except for those areas covered by detectors A, B(O), B(90). This array is particularly suitable for inspecting masks with manhattan features, that is, masks in which all the valid edges of features are horizontal or vertical. Thus, when photomasks of such configuration are scanned, the light diffracted from valid features falls almost entirely upon detectors A, B(O), or B(90). A horizontal edge causes light to fall on detectors A and B(O), and a sharp corner causes light to fall on detectors A, B(O) and B(90). A vertical edge produces a diffraction pattern, the light from which falls on detectors A and B(90). Inasmuch as defects in the photomask invariably have portions of their perimeter in a non-manhattan orientation, the light from these edges is diffracted into the areas covered by detector C, and thus are detected by observing a signal from that detector.

A problem arises from the fact that corners are not infinitely sharp and, therefore, as explained in connection with FIGS. 5*a*, 5*b* and 5*c*, a small amount of light from these valid features may reach detector C. If it is desired to detect very small defects, the corner signal may spuriously indicate a defect. Inasmuch as a corner is detected by B(O) and B(90), whenever there is simultaneous illumination of these detectors it signifies that a corner is present and any signal at detector C can be automatically ignored. One way of achieving this is by providing electronically that the properly scaled product of the signals from B(O) and B(90) is subtracted from the signal from detector C, thereby suppressing the corner signal.

The inspection of patterns having other than just manhattan geometries may be done using the annular photodetector array shown in FIG. 8. A known characteristic of the diffraction pattern for all valid edges and corners is that the radial intensity distribution is essentially the same for all such edge and corner orientations. Defects, however, because of their ragged and highly curved features generally produce a diffraction pattern with a radial intensity function which differs from that produced by the valid features of the photomask. A defect can be detected therefore, by measuring in real time the ratio of the light diffracted into detector B to that diffracted into detector C. For edges and corners the ratio is almost constant as the spot scans over them, but for defects, including even those which might scatter less total light than an edge, the diffraction patterns have radial intensity distributions which produce different ratios. This detection technique is independent of the light intensity.

For may defects the absolute intensity of the diffracted light from the defect will also be greater than that from valid edges and corners. Under these circumstances, the defect then is detected when the signal of detector B or C of the array of FIG. 8 exceeds a certain threshold.

The foregoing defect detection arrangements function best when the diffracted light associated with the defect is reasonably strong. Some categories of defects in thin film emulsion masks diffract less strongly because of their mild edge gradients. An advantageous configuration to detect such defects is the arrangement shown in FIG. 9 which represents schematically, the preferred embodiment depicted in FIGS. 1 and 2. A particularly useful mode of detection with this form of photodetector array is to apply the outputs of the C detectors to a computer which selects the maximum and minimum responses at any instant and determines the ratio of these values. From a consideration of the diffraction patterns associated with valid edges as shown in FIGS. 4*a*[1], 4*b*[1], 4*c*[1] and 5*a*[1], 5*b*[1] and 5*c*[1], it can be seen that this ratio has a large value for valid features. For defects, on the other hand, the ratio is anomalously small, thereby enabling their detection.

It will be understood that variations in this basis embodiment may be devised. For example, by means of additional optical arrangements the photomask may be scanned by a pair of spots thus expediting the inspection process.

What is claimed is:

1. A method for detecting defects in a photomask having a substantially straight edge pattern thereon comprising the steps of a. scanning the photomask with a light spot from a beam of coherent light which illuminates no more than two edges comprising a corner of the pattern at a time, b. collecting the light transmitted and diffracted by illuminated portions of the photomask, c. presenting the collected light to a photodetector array, and d. processing the electrical signals from the photodetector array to derive an indication that a defect has been scanned.

2. The method in accordance with claim 1 in which the step of processing the electrical signals includes comparing the magnitude of signals from different portions of the photodetector array.

3. The method in accordance with claim 1 in which the step of presenting the collected light includes dividing and separating the collected light into portions.

4. The method in accordance with claim 3 in which the step of dividing produces a central portion and at least two annular portions.

5. The method in accordance with claim 4 in which the step of dividing includes separating the outermost annular portion of the collected light into separate, equal segments.

6. The method in accordance with claim 5 in which the step of processing the electrical signals includes comparing the magnitude of the maximum and minimum signals produced by the segmental portions of said collected light.

7. Apparatus for detecting defects in a photomask having a substantially straight edge pattern thereon comprising:

a. a source of a beam of coherent light having a spot size which illuminates no more than two edges comprising a corner of the pattern at a time, b. means for scanning the beam over said photomask, c. means for collecting the light transmitted and diffracted by said photomask, and d. photodetecting means for translating the collected light into signals indicating the presence or absence of a defect in said photomask.

8. Apparatus in accordance with claim 7 including means for dividing and separating the collected light beam into separate portions for presentation to the photodetecting means.

9. Apparatus in accordance with claim 8 in which said photodetecting means comprise photodetectors arranged to receive separately corresponding portions of the divided and separated light beam.

* * * * *